United States Patent [19]

Itoh et al.

[11] Patent Number: 5,876,867
[45] Date of Patent: Mar. 2, 1999

[54] PLATINUM SKELETON ALLOY-SUPPORTED ELECTROCATALYST, ELECTRODE USING THE ELECTROCATALYST, AND PROCESS FOR PRODUCING THE ELECTROCATALYST

[75] Inventors: Takashi Itoh, Ichikawa; Katsuaki Katoh, Numazu; Tuyoshi Hashimoto, Ichikawa, all of Japan

[73] Assignee: N.E. Chemcat Corporation, Tokyo, Japan

[21] Appl. No.: 917,620

[22] Filed: Aug. 26, 1997

[30] Foreign Application Priority Data

Aug. 26, 1996 [JP] Japan .................................. 8-242677

[51] Int. Cl.$^6$ .................................................. H01M 4/86
[52] U.S. Cl. .............................. 429/44; 429/40; 502/101; 502/185; 204/293; 204/294; 204/290 R
[58] Field of Search ........................ 429/40, 44; 204/293, 204/294, 290 R; 502/101, 185; 420/466

[56] References Cited

U.S. PATENT DOCUMENTS

| | | | |
|---|---|---|---|
| 4,970,128 | 11/1990 | Itoh et al. | 429/44 |
| 5,024,905 | 6/1991 | Itoh et al. | 429/44 |
| 5,079,107 | 1/1992 | Jalan | 429/44 |
| 5,096,866 | 3/1992 | Itoh et al. | 502/101 |
| 5,178,971 | 1/1993 | Itoh et al. | 429/40 |
| 5,189,005 | 2/1993 | Watanabe et al. | 429/44 |
| 5,225,391 | 7/1993 | Stonehart et al. | 429/40 |
| 5,759,944 | 6/1998 | Buchanan et al. | 502/185 |

*Primary Examiner*—Bruce F. Bell
*Attorney, Agent, or Firm*—Oblon, Spivak, McClelland, Maier & Neustadt, P.C.

[57] ABSTRACT

An electrocatalyst comprising an alloy of platinum with a base metal selected from the group consisting of gallium, vanadium, chromium, manganese, iron, cobalt, nickel and copper, having a structure of vacant lattice site type lattice defects; the alloy being supported on a conductive carbon powder. The electrocatalyst is useful as a platinum-supported catalyst for an electrode, and has a superior electrochemical oxygen reduction activity and has platinum alloy particles having less base metal component.

16 Claims, 2 Drawing Sheets

FIG. 1

PLATINUM SKELETON ALLOY-SUPPORTED ELECTROCATALYST, ELECTRODE USING THE ELECTROCATALYST, AND PROCESS FOR PRODUCING THE ELECTROCATALYST

BACKGROUND OF THE INVENTION

1. Field of the Invention

This invention relates to a catalyst for electrode (hereinafter referred to as "electrocatalyst") for acid electrolyte type fuel cells such as phosphoric acid type fuel cells or proton-exchange membrane type fuel cells.

2. Description of the Prior Art

Catalysts comprising a conductive carbon powder carrier on which platinum (Pt) is dispersedly supported and having a corrosion resistance to phosphoric acid heated at a high temperature of about 200° C. are conventionally used as electrocatalysts for the phosphoric acid type fuel cells. Furthermore, in recent years, catalysts comprising a conductive carbon powder on which an alloy of platinum with a base metal element such as gallium, titanium, vanadium, chromium, iron, cobalt, nickel or copper is supported have been developed in order to improve the activity of oxygen reduction reaction in the cathode (U.S. Pat. Nos. 4,186110 and 4,447,506, Japanese Pre-examination Patent Publication (kokai) Nos. 60-7941, 61-8851 and 62-163746, etc.). Meanwhile, as electrocatalysts for proton-exchange membrane type fuel cells, platinum black catalysts have been used from old times, but catalysts comprising a conductive carbon powder on which platinum is highly dispersedly supported are now put into use so that the amount of platinum used can be reduced. Also in such catalysts, researches are made on catalysts formed of an alloy with a base metal so that the oxygen reduction activity of the cathode can be improved [G. Tamizhmani & G. A. Capuano, J. Electrochem. Soc., Vo.141, No.4 (1994)].

Such platinum alloy-supported catalysts are usually produced in the following way. First, platinum is supported on a conductive carbon powder to prepare a platinum-supported carbon powder (a precursor), and then this precursor platinum-supported carbon powder is added in an aqueous solution of a compound such as a salt of base metal element to fix the base metal component on the platinum-supported carbon by the aid of an alkali such as sodium-hydroxide or ammonia or a reducing agent such as hydrazine or formalin, followed by treatment in a stream of nitrogen or in a stream of hydrogen at a high temperature of 800° C. to 1,000° C. to alloy the base metal and platinum.

Such platinum alloy-supported catalysts have an improved oxygen reduction activity compared with the precursor platinum-supported carbon powder and hence are known to be greatly improved in current-voltage characteristics (I-V characteristics; the same applies hereinafter) when used as cathode catalysts for phosphoric acid type fuel cells.

Japanese Pre-examination Patent Publication (kokai) No. 3-127459 reports that in the production of such an alloy-supported catalyst all the base metal used is not completely made into an alloy and is partly deposited on and adheres to the carbon surface, and it is proposed to remove free base metal by washing the catalyst with an aqueous dilute acid solution to thereby suppress the wetting of the catalyst to the electrolyte so that the cell can have a longer lifetime.

Advantages of skeleton catalysts whose representative is Raney nickel are also known from old times. Platinum skeleton catalyst electrodes prepared by dissolving the base metal component out of an electrode formed of an alloy of platinum with a base metal, not supported on a carrier, were studied in the 1960's as electrodes for fuel cells (U.S. Pat. No. 3,429,75). Meanwhile, a platinum-supported skeleton catalyst prepared by removing Fe from a Pt-Fe alloy-supported catalyst (U.S. Pat. No. 4,187,200) is known to exhibit a high activity in hydrogenation reaction, but there is no disclosure as to whether it is useful as an electrocatalyst.

Under operation conditions of fuel cells in which an acid electrolyte and oxygen are present together, not only the base metal not alloyed with platinum but also the base metal in platinum-base metal alloy crystals can not avoid gradually dissolving in the electrolyte. The base metal having dissolved in the electrolyte is either reduced at a portion having a more basic potential in the cell to become deposited there, or crystallized because of a lowering of solubility at a lower-temperature portion to become deposited, thus there is a possibility of clogging pores of a gas diffusion electrode. Especially in the case of proton-exchange membrane type fuel cells, there is also a possibility that base metal ions react with the electrolyte to cause a lowering of the conductivity of the electrolyte. Hence, in order to make fuel cells have a longer lifetime, it is desired to make the base metal less dissolve out of the alloy.

Meanwhile, in the base metal/platinum alloy-supported catalysts, it is usually indispensable to alloy the materials at a high temperature in the step of preparation. As a result of this high-temperature treatment, the platinum is alloyed with the base metal and at the same time may cause crystal growth. Hence, it is not always easy to prepare a platinum alloy catalyst having, e.g., an average crystal particle size not larger than 50 A (angstrom, 1 A=0.1 nm; the same applies hereinafter). Accordingly, it is sought to provide as an electrocatalyst for fuel cells a platinum-supported catalyst that retains crystal forms of an alloy highly active in oxygen reduction and yet has platinum alloy particles made finer and also containing less base metal component.

SUMMARY OF THE INVENTION

To solve the above problems, the present inventors made extensive studies on how the crystal forms of platinum alloys supported on carbon affect the activity and lifetime required as electrocatalysts for fuel cells. As the result, they have discovered that a skeleton catalyst comprising an alloy of platinum with a specific base metal component, the base metal component having been selectively removed from alloy crystals, exhibits an unexpectedly high activity and long-term stability as a fuel cell electrocatalyst, and thus have accomplished the present invention, More specifically, the electrocatalyst of the present invention is a catalyst comprising an alloy of platinum with at least one base metal selected from the group consisting of gallium, vanadium, chromium, manganese, iron, cobalt, nickel and copper, having a structure of vacant lattice site type lattice defects (hereinafter said alloy being referred to as "platinum skeleton alloy") and a conductive carbon powder, the alloy being supported on the conductive carbon powder (hereinafter the catalyst being referred to as "platinum skeleton alloy supported catalyst").

The platinum skeleton alloy catalyst of the present invention has a lattice constant compressed to the one comparable to a base metal-rich solid solution alloy and has a smaller crystallite diameter, and hence can have a very higher mass activity for the oxygen reduction reaction in the cathode of fuel cells than conventional catalysts of platinum-base metal alloy-supported on carbon. Moreover, because of a greatly controlled content of the base metal, the catalyst has a superior long-term stability, and acid electrolyte fuel cells using this catalyst exhibit a higher out-put and a longer lifetime, and can be greatly effective in practical use.

DESCRIPTION OF THE PREFERRED EMBODIMENTS

Electrocatalyst

Platinum skeleton alloy:

The platinum skeleton alloy which is an active metal of the catalyst of the present invention is supported on a conductive carbon powder in the state of fine particles.

The platinum skeleton alloy is an alloy in which the base metal in the crystal lattice of a precursor thereof, a platinum-base metal alloy, has been removed at least in part. This precursor alloy is a substitutional solid solution alloy. In general, single platinum is face-centered cubic (fcc), and substitutional solid solution alloys formed by alloying platinum and other metal elements may have various crystal forms. However, solid solution alloys formed by alloying platinum and at least one base metal selected from the group consisting of gallium, vanadium, chromium, manganese, iron, cobalt, nickel and copper have any of disordered face-centered cubic, ordered cubic and ordered tetragonal forms. In addition, in these alloys, the diffraction angle 2 θcorresponding to the main diffraction line (111) in their X-ray diffraction is present on the side of a higher angle than that of the single platinum, and crystal lattice constant $a_c$ of the cubic alloys or lattice constants $a_t$ and $c_t$ of the tetragonal alloys has/have the relationship of $a_c < a_o$, or $a_t \{3/(2+a_t^2/c_t^2)\}^{1/2} < a_o$, with respect to lattice constant $a_o$ of the single platinum.

It has been found that, when the base metal only is selectively removed at least in part from such a platinum-base metal alloy while retaining the crystal form of the alloy, the lattice sites having been held by the base metal become vacant, so that an alloy having vacant lattice site type lattice defects, i.e., the platinum skeleton alloy can be obtained. With an increase in the degree at which the base metal is removed, the alloy becomes finer as a result of the break of alloy particles.

Such a platinum skeleton alloy retains its original crystal form even though the compositional proportion of platinum has become larger than the original solid solution alloy, and hence it exhibits a higher oxygen reduction activity than the single platinum of course and than any compositionally corresponding solid solution alloys (having substantially no vacant lattice site).

In the platinum skeleton alloy supported catalyst of the present invention, there are no particular limitations on the amount of the platinum and base metal to be supported on the carrier, conductive carbon powder, and on the atomic ratio of platinum to base metal. Preferably, the platinum may be supported in an amount of 1% to 60%, and particularly preferably 5% to 50%, based on the whole catalyst (the amount of the metal to be supported, based on the whole catalyst, is indicated by weight; the same applies hereinafter); in the case of a cathode catalyst for phosphoric acid type fuel cells, particularly preferably from 5% to 30%, and in the case of a cathode catalyst for proton-exchange membrane type fuel cells, particularly preferably from 20% to 50%.

The amount of the base metal remaining in the platinum skeleton alloy may be 0% in an extreme case, but there is no advantage in practical use if it is completely removed. In usual cases, the platinum and base metal in the platinum skeleton alloy may preferably be in an atomic ratio of from 1:1 to 1:0.05, and particularly preferably from 1:0.5 to 1:0.1.

Conductive carbon powder

As the conductive carbon powder used as a carrier in the electrocatalyst of the present invention, any conductive carbon powders known as carriers for fuel cell electrocatalysts may be used. More specifically, carbon black powders such as oil furnace black and acetylene black may be used which have characteristics of a BET specific surface area of from 50 to 1,500 $m^2/g$, a graphite (002) crystallite diameter of from 7 to 80 A, a graphite crystal interlattice distance $d_c$ (002) of from 3.40 to 3.70 A, and a DBP oil absorption of from 50 to 700 ml/100 gC. These carbon black may be heated at 1,600° C. to 2,800° C. in an inert gas or in vacuo in order to improve durability under conditions where acid electrolyte fuel cells are used, or may be heated at 500° C. to 900° C. in an atmosphere of water vapor to improve surface roughness so that the volatile components can be removed and also the catalyst active metal can be more stably supported. In particular, as the carrier of the cathode catalyst for phosphoric acid type fuel cells, at least partially graphitized carbon black having a BET specific surface area of from 50 to 180 $m^2/g$ and a graphite (002) crystallite diameter of from 10 to 70 A is preferred. As the carrier of the cathode catalyst for proton-exchange membrane type fuel cells, carbon black having a BET specific surface area of from 120 to 1,500 $m^2/g$ and a graphite (002) crystallite diameter of from 7 to 35 A is particularly preferred.

Production of Electrocatalyst

The electrocatalyst of platinum skeleton alloy supported on carbon of the present invention, having the structure of vacant lattice site type lattice defects described above, can be produced in the following way.

That is, in the first step, the solid solution alloy of platinum with at least one base metal selected from the group consisting of gallium, vanadium, chromium, manganese, iron, cobalt, nickel and copper is supported on the conductive carbon powder in a highly dispersed state to form a catalyst precursor of platinum alloy supported on carbon. Next, in the second step, the catalyst precursor is subjected to treatment to selectively remove only the base metal component at least in part from the crystal lattice of catalyst precursor while retaining the crystal form to thereby bring about the structure of vacant lattice site type lattice defects, thus the desired catalyst can be produced.

There are no particular limitations on methods for preparing the precursor catalyst of platinum alloy supported on carbon so long as the ordered alloy or disordered solid solution alloy is formed in a highly dispersed state. Various known preparation methods may be used, as exemplified by an alloying method in which catalyst components are supported in a single-step followed by heat treatment, an alloying method in which the catalyst component is supported in a multiple-step followed by heat treatment, and a method in which the base metal is alloyed and supported on a platinum-supported carbon powder (the electroless plating method).

As a degree of alloying, it is preferred that the greater part (90% or more) of the base metal supported on carbon is present as an alloy with platinum and the base metal present apart from platinum on the carbon is less than 10%, or that the greater part (90% or more) of the platinum supported on carbon is present as an alloy with base metal and the platinum present singly by itself on the carbon is less than 10%. They can be alloyed in such a sufficient degree in the following way: For example, in the case of an alloying method in which catalyst components are supported in a two-step followed by heat treatment, first the platinum is supported on carbon powder in a highly dispersed state to prepare a platinum-supported carbon powder. Next, this platinum-supported carbon powder is slurried in an aqueous dilute solution of a salt of the base metal element, and the base metal element is adsorbed or fixed on the platinum-supported carbon powder by alkali treatment or wet-process reduction, followed by filtration, washing and drying to prepare a base metal and platinum-supported carbon powder as a precursor or intermediate. Then, this is retained in an inert gas such as nitrogen or helium, in vacuo or in a stream of hydrogen gas, at a temperature necessary and sufficient for completely alloying the base metal and platinum supported on the carbon carrier and of a degree not to cause excessive aggregation (sintering) of the alloy crystals formed, and for a necessary and sufficient time, followed by cooling to room temperature. These conditions depend on the method for obtaining the desired catalyst of platinum alloy supported on carbon carrier. The alloying by heat treatment may preferably be carried out at a temperature of, e.g., from 750° C. to 1,000° C., and more preferably from 800° C. to 900° C., for a retention time of from 1 minute to 5 hours, and more preferably from 20 minutes to 2 hours.

Whether or not the precursor or intermediate obtained in the first step is in a sufficiently alloyed state can be ascertained by various methods. For example, it can be microscopically ascertained by observation of powder using an analytical transmission electron microscope. More specifically, it can be ascertained when, in a transmission electron microscope (TEM) image of 300,000 to 1,000,000 magnifications, every particle of metal particles of tens of angstroms in diameter, supported on the surfaces of carbon particles of hundreds of angstroms in primary particle diameter, gives values of elementary analysis which are almost in conformity with the alloy composition of the whole powder (bulk) in respect of its energy dispertive X-ray spectroscopy (EDX) and on the other hand the EDX at every part of the carbon carrier detects no significant presence of each of the base metal and the platinum alone.

The state of being alloyed can be macroscopically ascertained by plotting lattice constants vs. alloy compositions of solid solution alloys. More specifically, catalyst of platinum alloy-supported on carbon carrier with a series of composition are prepared by changing the atomic ratio of platinum to base metal, and X-ray diffraction lattice constants of the respective alloys are measured to plot the composition vs. lattice constant on X-Y coordinates, where the Vegard law is established so long as a perfect solid solution alloy is formed within a given compositional range, and the lattice constants of the alloy are on a diagonal line connecting the respective lattice constants of the single platinum and the single base metal or a curve which is close thereto.

The second step in the production process of the catalyst of the present invention will be detailed below. The second step is the step of making treatment to selectively remove only the base metal component at least in part from the crystal lattice of the catalyst precursor of platinum alloy-supported on carbon carrier while retaining the structure and physical properties of the carbon carrier and while retaining the crystal form of the platinum alloy supported thereon, to thereby bring about the structure of vacant lattice site type lattice defects; thus the catalyst of platinum skeleton alloy-supported on carbon carrier being obtained.

There are no particular limitations on methods for the above so long as they are methods of selectively removing only the base metal component from the alloy crystal lattice while retaining the crystal form of the platinum alloy without changing the structure and physical properties of the carbon carrier. For example, known methods can be used in which the catalyst precursor of platinum alloy-supported on carbon is treated with an aqueous solution of an acid that dissolves the base metal element but does not dissolve the platinum (i.e., liquid-phase leaching), or heat-treated in a gas stream of a gas of an element or compound that forms a volatile compound with the base metal element but does not form a volatile compound with the platinum, as exemplified by chlorine ($Cl_2$) or carbon monoxide (CO) (i.e., gas-phase leaching). There are no particular limitations on the rate of removal of the base metal element. As stated previously, the base metal may be completely removed from the alloy crystal lattice without changing the crystal form, and it is not impossible to do so, but not essential in practical use. In usual cases, the base metal may be removed in such an amount of 20% to 99%, and preferably from 30% to 95%, of its content in the original platinum solid solution alloy.

Any excessive leaching is not preferable because it may cause a change in crystal form. Any excessive application of heat during the leaching or after the leaching or any leaching carried out under conditions that may cause dissolution of platinum in the alloy is not preferable because it might cause a change in lattice constants of platinum to change into the equilibrium lattice constants of the platinum-rich solid solution alloy corresponding to the composition which would be formed if the dissolution occurs (i.e., change into an alloy of crystal structure having no vacant lattice sites).

It is also not preferable that the structure and physical properties of the carrier conductive carbon powder greatly change with the leaching treatment of the base metal. If the structure of carbon is cut off or the corrosion of surfaces proceeds, there is a possibility of causing the supported solid solution alloy to come off, dissolve or aggregate.

As a method for selectively removing the base metal component from the crystal lattice while retaining the crystal form of the catalyst precursor, supported platinum solid solution alloy without changing the structure and physical properties of the carbon carrier, it is preferable to suspend the platinum solid solution alloy-supported carbon powder in phosphoric acid heated to 100° C. to 200° C. or in an aqueous mineral acid solution kept at a temperature of room temperature to 100° C. in an atmosphere where the oxygen pressure has been made lower than air, preferably in an atmosphere containing substantially no oxygen, e.g., in a stream of nitrogen, and maintain the resultant suspension with stirring for a certain time, followed by cooling, filtering, and washing with hot deionized water until the filtrate has an electrical conductivity of 20 $\mu$S/cm or less, and subsequently drying in vacuo or in an stream of nitrogen gas at 110° C. to obtain the desired catalyst. As the mineral acid, sulfuric acid and nitric acid are preferred, which may preferably be in a concentration of from 0.1 to 1.0N. The heated phosphoric acid may preferably be in a concentration of from 85 to 105%. If such wet leaching with an acid is carried out in the atmospheric environment, the catalyst is exposed to an open-circuit potential of 1 V or higher at the interface where the catalyst slurry come into contact with oxygen, so that the platinum may dissolve out of the alloy or the corrosion of the carbon powder may proceed, thus such leaching is not preferred. In the atmospheric environment, the lattice constant of the platinum skeleton alloy tends to greatly come near to that of the platinum-rich solid solution alloy.

Whether or not the platinum skeleton alloy supported carrier has been formed as a result of the second step can be ascertained in the following way. First, elementary analysis of the catalyst obtained is carried out to make sure that only the base metal has been removed out of the initially supported alloy and the platinum and carbon have been recovered. Powder process XRD (X-ray diffractometry) of the catalyst is further carried out to make sure that the crystal form of the original platinum solid solution alloy is retained, and that the lattice constant is retained substantially in the state of the original solid solution alloy though a little change may occur, that is, it is close to that of the original base metal-rich solid solution alloy rather than to the lattice constant that the resultant platinum skeleton alloy would have, if it were a solid solution alloy.

Whether or not the supported platinum skeleton alloy used in the present invention has the structure of vacant lattice site type lattice defects, i.e., a non-equilibrium crystal structure can be ascertained in the following way. The powder of the platinum skeleton alloy supported catalyst of the present invention is subjected to in situ XRD in an atmosphere of inert gas or in vacuo. As the temperature is gradually raised from room temperature up to a temperature to be used when the materials are alloyed, it is ascertained that the crystal form and lattice constant of the alloy change from those of the platinum skeleton alloy to those of the solid solution alloy corresponding to the platinum-rich composition from which the base metal has been removed. Even after cooling to room temperature, the change in crystal form and lattice constant that has taken place during the temperature rise is maintained, and the crystal form and lattice constant no longer return to those of the original platinum skeleton alloy. That is, in the platinum skeleton alloy supported catalyst obtained in the second step, the platinum skeleton alloy still retains, in the platinum-rich composition from which the base metal has been removed, the equilibrium crystal form and lattice constant in the base metal-rich composition. Thus, the platinum skeleton alloy is shown to have a structure of vacant lattice site type lattice defects.

The BET specific surface area of the catalyst is measured and the carbon graphite (002) crystallite diameter and crystal interlattice distance are analyzed by XRD to ascertain that there is no change in structure and physical properties of the carrier carbon.

There are also no particular limitations on the platinum crystallite diameter of the platinum skeleton alloy supported catalyst of the present invention, thus obtained. It may preferably be from 15 to 100 A, and particularly preferably from 20 to 60 A.

There are still also no particular limitations on the metal surface area of the platinum. It may preferably be from 30 to 200 m$^2$/g Pt, and particularly preferably from 50 to 150 m$^2$/g Pt. In the present specification, the metal surface area of platinum is indicated as an electrochemical metal surface area EC. MSA (m$^2$/g Pt) obtained by measuring electrical quantity of hydrogen absorption on the platinum surface in the cathodic sweep of cyclic voltammetry made on catalyst electrodes.

Characteristics

In the present specification, the electrochemical oxygen reduction activity of the catalyst is evaluated on the basis of mass activity. The mass activity is determined in the following way. In an oxygen-electrode half cell ($O_2$ half cell), a current density (mA/cm$^2$) obtained at a potential of plus 900 mV vs. a reference hydrogen electrode (RHE, the same applied hereinafter) is determined, and the resultant value is divided by a platinum loading amount (mg Pt/cm$^2$) per electrode unit area to give a current density per unit platinum mass, i.e., the mass activity (mA/mg Pt).

Stated more specifically, first, according to the electrode preparation method described later, the carbon carrier catalyst powder is bound to carbon paper together with water-repellent binder to form a gas diffusion electrode, and its catalyst-layer side is disposed to the 105% phosphoric acid heated to 200° C. and the opposite side exposed to a stream of oxygen ($O_2$) gas. This is incorporated in a half cell apparatus, and the current density (mA/cm$^2$) produced is determined when a voltage of 900 mV (IR-free) vs. the reference hydrogen electrode (RHE) is applied between the working electrode and the platinum mesh counter electrode, and the resultant value is divided by a platinum loading amount (mg Pt/cm$^2$) per electrode unit area to give the mass activity (mA/mg Pt).

In the platinum skeleton alloy supported catalyst of the present invention, the platinum is very highly activated. Especially when used as the cathode electrode for fuel cells, it exhibits a higher oxygen reduction activity than the platinum single supported catalyst as a matter of course and than any of the catalyst precursor having platinum alloy supported on carbon, with no vacant lattice sites and the catalyst of solid solution alloy supported having the composition corresponding to that after removal of the base metal but having no vacant lattice sites.

A typical platinum supported catalyst (20%Pt/C) has a mass activity of 39 mA/mg Pt, and a known catalyst A of base metal-rich platinum-base metal alloy-supported on carbon (19% Pt-6% Cu/C) and a known catalyst B of platinum-rich platinum-base metal alloy-supported on carbon (20% Pt-1.5% Cu/C) have a mass activity of 69 mA/mg Pt and 70 mA/mg Pt, respectively. In contrast, the catalyst of platinum skeleton alloy-supported on carbon (20% Pt-2.6% Cu/C) of the present invention, originating from the catalyst A, has a mass activity of 80 mA/mg Pt, showing a higher activity than any of known catalysts.

The platinum skeleton alloy supported catalyst of the present invention was used in the air-electrode cathode, a conventional platinum supported catalyst was used in the anode and an SiC matrix sheet impregnated with 105% phosphoric acid was held between a pair of these electrodes to set up a small-size single cell. Under the conditions that air was passed through the cathode and hydrogen gas or the reformate model gas comprised of 80% hydrogen and 20% $CO_2$ was passed through the anode, a long-term operation test for thousands of hours or longer was carried out at a constant cell temperature in the range of 190° C. to 220° C. In such a test, it has been found that the cell using the catalyst of the present invention in the cathode has a higher initial terminal voltage, and has a smaller rate of deterioration of the terminal voltage when operated at a constant current density and has been made stabler than any of the single platinum supported catalyst, the catalyst precursor of platinum alloy supported on carbon having no vacant lattice sites and the platinum solid solution alloy supported on carbon having the same composition as that of the present invention but having no vacant lattice sites.

Electrode for Fuel Cells

The electrode for fuel cells employing the platinum skeleton alloy supported catalyst of the present invention will be described below.

This electrode for fuel cells comprises the platinum skeleton alloy supported catalyst described above and a water-repellent binder which are bound to a conductive and porous support substrate. In addition, especially as the electrode for phosphoric acid type fuel cells, it is essential for the support substrate to be acid-resistant.

As the water-repellent binder, polymer binders as exemplified by polytetrafluoroethylene, polyfluoroethylene propylene and perfluoroalkoxypolyethylene may be used. As the conductive and acid-resistant porous support substrate, gas-permeable carbon paper which have been subjected to water-repellency treatment with the above water-repellent binder, or a mesh screen of metal such as, tantalum and niobium may be used. This is especially useful as the electrode for acid electrolyte fuel cells, in particular, as the oxygen reduction cathode of phosphoric acid type fuel cells.

The electrode of the present invention can be produced, e.g., in the following way. First, the platinum skeleton alloy supported catalyst obtained as described above is mixed with a suspension of polytetrafluoroethylene to form a uniform suspension. Meanwhile, carbon paper having been subjected to water-repellency treatment with a similar acid-resistant polymer material is prepared, and the uniform mixture suspension of the above catalyst and the water-repellent binder is coated thereon by filtration suction, spraying or roll coating, followed by pressure bonding and then baking in an atmosphere of inert gas.

The platinum skeleton alloy may preferably be present on the electrode support substrate only in an catalytically effective amount, which is usually in the range of from 0.1 to 3 mg, more preferably from 0.2 to 2 mg, and still more preferably from 0.5 to 1 mg, in terms of platinum per square centimeter of geometrical surface area of the electrode support substrate.

The present electrode can be used as a gas diffusion electrode such as a button cell, a gas sensor electrode or an electrolysis electrode, and is especially suitable as an electrode for acid electrolyte fuel cells. As electrolytes used in such fuel cells may include phosphoric acid, sulfuric acid, hydrochloric acid, and super acid such as trifluoromethanesulfonic acid, difluoromethanedisulfonic acid and polytrifluoroethylenesulfonic acid, or mixtures of any of these.

EXAMPLES

The present invention will now be described below in greater detail by way of Examples and Comparative Examples. The present invention is by no means limited to these.

1. Production of catalyst:

Comparative Example 1

(Production Example 1)
Production of Platinum skeleton alloy supported catalyst:

In 1,500 ml of deionized water containing 4.0 g of glacial acetic acid, 81 g of heat-treated conductive carbon black (trade name: VULCAN XC-72R, available from Cabot Corp.) having a specific surface area of 110 $m^2/g$ was dispersed by ultrasonic dispersion machine and made into a slurry. In 600 ml of deionized water, 9.0 g of platinum as $H_2Pt(OH)_6$ was dissolved together with amine to prepare a platinum solution. The platinum solution was added to the carbon slurry with stirring. Thereafter 50 g of an aqueous 5% formic acid solution was added as a reducing agent, and the temperature was then raised to 95° C. After the mixture was maintained at 95° C. for 30 minutes, it was cooled to room temperature, followed by filtration and then washing with deionized water. The filtered cake thus obtained was dried in a stream of nitrogen at 95° C. for 16 hours. Powder process XRD of the resultant 10 wt.% Pt/C (C-1*) (the asterisk * means Comparative Example; the same applies hereinafter) revealed that it had a Pt (111) crystallite diameter of 15 A and a face-centered cubic lattice constant a of 3.923 A.

Comparative Example 2

(Production Examples 2 to 9)
Production of platinum-copper alloy-supported catalysts:

In 1,000 ml of deionized water, 50 g of Pt/C powder (C-1*) obtained in Production Example 1 was dispersed by means of an ultrasonic dispersion machine and made into a slurry. To this slurry, 150 ml of an aqueous solution containing 0.435 g of Cu as copper (II) nitrate was added with the slurry being stirred thoroughly vigorously, and thereafter the pH of the slurry was adjusted to 8.0 while slowly dropwise adding an 5% hydrazine dilute aqueous solution. After stirring at room temperature for 1 hour, the slurry was filtered and then washed with deionized water. Thereafter, the resultant cake was dried in a stream of nitrogen at 95° C. for 16 hours. Subsequently, this was kept in a stream of 7% by volume of hydrogen (the balance being nitrogen) at 900° C. for 1.2 hour, and thereafter cooled to room temperature to obtain Pt—Cu alloy/C (C-2*). As a result of elementary analysis, metal components were each in a content of Pt: 10.2 wt.%, and Cu: 0.87 wt.%, and Pt:Cu atomic ratio was 79%:21%. Its XRD revealed that the face-centered cubic solid solution alloy had a crystallite diameter of 40 A and a lattice constant a of 3.876 A. From XRD spectra of the alloy-supported catalyst, only a face-centered cubic solid solution alloy phase was detected, and neither a diffraction peak of single platinum nor a diffraction peak of single Cu was not detected at all. In the observation on an analytical transmission electron microscope, the analysis by EDX of individual metal particles supported on carbon ascertained that the alloy composition for each particle all well corresponded to Pt:Cu atomic ratio of the bulk, thus the metal components had been substantially completely alloyed, and almost no single-platinum particles and single-copper particles were present.

The same procedure as the above was repeated but variously changing the amount of copper to produce Pt—Cu solid solution alloy-supported-on-carbon catalysts (C-3*) to (C-9*), and their lattice constants were measured by XRD.

Comparative Example 3

(Production Example 10)
Production of copper supported catalyst:

The procedure of Production Example 2 was repeated except that the 10% Pt/C was replaced with 45 g of carbon powder used in Production Example 1 to make it into a slurry, followed by addition of an aqueous copper (II) nitrate solution containing 5.0 g of Cu. Thus, 10% Cu/C catalyst powder (C-10*) was obtained. Its XRD revealed that the supported face-centered cubic Cu had a lattice constant a of 3.620 A.

Pt:Cu atomic ratio (composition) and face-centered cubic (fcc) solid solution alloy lattice constants are given together in Table 1.

TABLE 1

Composition and lattice constant of Pt-Cu alloy supported on carbon

| Catalyst No. | Analytical quantity of supported metal | | Composition (atomic ratio) | | Lattice constant (A) |
|---|---|---|---|---|---|
| | Pt(wt %) | Cu(wt %) | Pt(%) | Cu(%) | |
| C-1* | 10.30 | 0 | 100 | 0 | 3.923 |
| C-2* | 10.24 | 0.87 | 79 | 21 | 3.876 |
| C-3* | 9.99 | 1.02 | 76 | 24 | 3.863 |
| C-4* | 9.90 | 1.64 | 66 | 34 | 3.842 |
| C-5* | 9.84 | 3.10 | 51 | 49 | 3.793 |
| C-6* | 9.73 | 5.01 | 39 | 61 | 3.756 |
| C-7* | 9.47 | 6.58 | 32 | 68 | 3.738 |
| C-8* | 9.34 | 8.06 | 27 | 73 | 3.723 |
| C-9* | 8.51 | 14.3 | 16 | 84 | 3.687 |
| C-10* | 0 | 10.1 | 0 | 100 | 3.620 |

Figure 1:
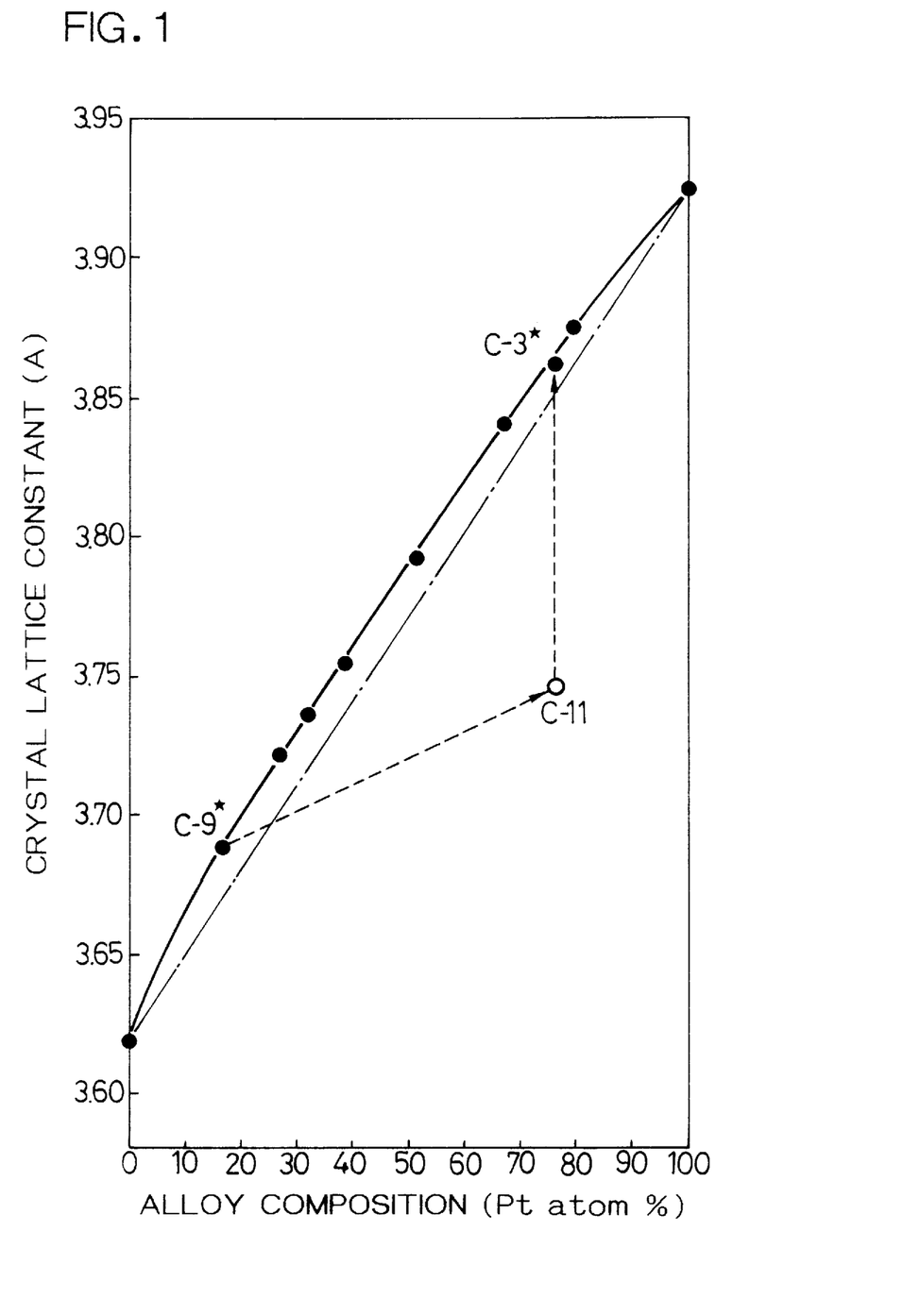
FIG. 1 is a graph showing the relationship between Pt—Cu atomic ratio and face-centered cubic lattice constant of a platinum-copper solid solution alloy supported on a carbon carrier.

The relationship between composition (or atomic ratio) and solid solution alloy face-centered cubic lattice constant a in the above Pt—Cu alloy supported catalyst is shown in FIG. 1. The plotting of the composition and lattice constant of the catalysts (C-1*) to (C-10*) of Production Examples 1 to 10 gave the Vegard law's curve as shown in FIG. 1. As is seen therefrom, the Pt—Cu alloys in the Pt—Cu alloys supported on carbon form substantially perfect solid solution alloys over the whole compositional range of from Cu 100% to Pt 100%, according to the Vegard law.

Example 1

(Production Example 11)
Production of platinum skeleton alloy supported catalyst:

20 g of the Pt—Cu alloy-supported catalyst (C-9*) powder of Comparative Example 3 was put into a 300 ml Teflon beaker with a cover, and 160 ml of 105% polyphosphoric acid was added thereto, followed by stirring while purging the inside of the beaker with nitrogen gas, using a stirring rod made of Teflon, so as to maintain the state of uniform suspension. The beaker was heated on a mantle heater to raise the temperature to 200° C., and the temperature was maintained with stirring for 4 hours. After cooling to room temperature, the slurry obtained was poured into 300 ml of cold deionized water to effect dilution, followed by filtration. The resultant solid was washed with deionized water until the filtrate came to have a lower conductivity than 20 µS /cm, and the cake obtained was dried at 95° C. in a stream of nitrogen for 16 hours to obtain Pt—Cu alloy-supported catalyst (C-11), the Pt—Cu alloy having been subjected to leaching. Its elementary analysis revealed that it had composition of 9.8% Pt-1.03% Cu/C (Pt:Cu atomic ratio being 76:24). Analysis of a mixed solution of the filtrate and the washing liquid revealed that Platinum dissolved out in a very small quantity (not more than 1% of the Platinum charged) and only Cu was selectively dissolved out. The XRD revealed that the catalyst had a Pt (111) crystallite diameter of 39 A and a face-centered cubic lattice constant a of 3.745 A. Incidentally, the alloy crystal lattice constant corresponding to the composition with a Pt:Cu ratio of 76:24 readable from the Vegard law's curve in FIG. 1 was a=3.868 A. As a matter of fact, the solid solution alloy-supported catalyst (C-3*) having the composition with a Pt:Cu ratio of 76:24, separately produced from 10% Pt/C (C-1*) according to Production Example 2 had a lattice constant of 3.863 A.

Thus, the C-11, despite having the composition with a Pt:Cu ratio of 76:24, had a lattice constant which was greatly smaller than the lattice constant 3.868 A of the solid solution alloy corresponding to this composition and was close to the a=3.687 A of the starting solid solution alloy having a Pt:Cu ratio of 16:84. Even though the Cu in the Pt—Cu alloy had been removed, the lattice constant was given as if the Cu were present, and hence the present catalyst (C-11) was identified as a skeleton catalyst having the structure of vacant lattice site type lattice defects. A programmed-temperature XRD cell was packed with powder of C-11, and the XRD spectrum at each temperature was measured while raising temperature from room temperature such as 50° C., 100° C. and 150° C. at the intervals of 50° C. in a stream of nitrogen gas. As a result, although the lattice constant was a=3.790 A at 300° C., showing almost no change from the state at room temperature, it was a=3.852 A at 700° C., showing a change to the lattice constant close to the Vegard law's curve in FIG. 1.

Thus, also from the change in lattice constant upon heating to a high temperature in an inert gas, it was confirmed that the catalyst C-11 was a skeleton catalyst having the structure of vacant lattice site type lattice defects.

The locations of C-9*, C-11 and C-3* are plotted in FIG. 1.

Comparative Example 4

(Production Example 12)
Production of platinum supported catalyst:

A 20% Pt/C catalyst (C-12*) was produced in the same manner as in Comparative Example 1 except that 72 g of carbon black powder was slurried in deionized water containing 8.0 g of glacial acetic acid, an aqueous amine solution of $H_2Pt(OH)_6$ in an amount corresponding to 18.0 g of Platinum was added, followed by reduction with 100 g of an aqueous 5% formic acid solution.

Comparative Example 5

(Production Example 13)
Production of platinum-copper alloy supported catalyst:

The procedure of Production Example 3 was repeated except that 50 g of the Pt/C catalyst (C-12*) of Production Example 12 was used and, to 2,500 ml of its deionized water slurry, 150 ml of an aqueous solution containing 3.2 g of Cu as copper (II) nitrate was added. Thus, a Pt—Cu alloy/C catalyst (C-13*) was obtained. Its elementary analysis revealed that it contained 18.8% by weight of Pt and 6.0% by weight of Cu in terms of dry weight, having a Pt:Cu atomic ratio of 50:50, and its XRD revealed that the catalyst was an alloy-supported catalyst having a Pt (111) crystallite diameter of 45 A and a face-centered cubic lattice constant a of 3.790 A.

The catalyst C-13* is an alloy-supported catalyst originating from 20% Pt/C, but its lattice constant is on the Vegard law's curve of the composition-lattice constant correlation of the Pt—Cu alloy-supported catalyst originating from 10% Pt/C.

Example 2

(Production Example 14)
Production of platinum skeleton alloy supported catalyst (C-14):

The procedure of Example 1 was repeated except that the Pt—Cu alloy-supported catalyst (C-13*) obtained in Production Example 13 was maintained in a stream of nitrogen gas in a 105% phosphoric acid slurry at 200° C. for 2 hours. Thus, a leaching residue (C-14) was obtained. Its elementary analysis revealed that it contained 19.7% by weight of Pt and 2.6% by weight of Cu in terms of dry weight (Pt:Cu atomic ratio being 71:29), and its XRD revealed that it was a catalyst having a Pt (111) crystallite diameter of 38 A and a face-centered cubic lattice constant a of 3.812 A. As viewed from FIG. 1, the lattice constant of the face-centered cubic solid solution alloy corresponding to the alloy having Pt:Cu atomic ratio of 71:29 is a=3.852 A, and hence the catalyst C-14 was identified as a platinum skeleton catalyst.

Comparative Example 6

(Production Example 15)
Production of platinum-cobalt alloy supported catalyst (C-15*):

The procedure of Production Example 3 was repeated except that 50 g of the Pt/C catalyst (C-12*) of Production Example 12 was slurried in deionized water and 150 ml of an aqueous solution containing 3.2 g of Co as cobalt (II) nitrate was added. Thus, a Pt-Co alloy/C catalyst (C-15*) was obtained. Its elementary analysis revealed that it contained 18.9% by weight of Pt and 5.7% by weight of Co in terms of dry weight (Pt:Co atomic ratio being 50:50), and its XRD revealed that the catalyst was a solid solution alloy-supported catalyst comprised of only a face-centered cubic alloy having a crystallite diameter of 32 A and a lattice constant a of 3.767 A.

Example 3

(Production Example 16)
Production of platinum skeleton alloy supported catalyst (C-16):

The procedure of Example 1 was repeated except that the Pt-Co solid solution alloy-supported catalyst (C-15*) obtained in Production Example 15 was used. Thus, a leaching residue (C-16) was obtained. Its elementary analysis and XRD revealed that it contained 19.9% by weight of Pt and 1.2% by weight of Co in terms of dry weight (Pt:Co atomic ratio being 83:17) and it was a face-centered cubic alloy catalyst having a crystallite diameter of 29 A and a lattice constant a of 3.787 A. Meanwhile, in a Pt-Co solid solution alloy-supported catalyst (C-17*) separately produced (as Production Example 17) in the same manner as in Production Example 15 except that the amount of Co charged was changed to 0.60 g, its XRD showed a face-centered cubic lattice constant a of 3.860 A. That is, the C-16, despite having the same composition as C-17*, had a clearly smaller lattice constant, which was close to that of the Co-rich alloy supported in the catalyst C-15* before removal of Co, and hence it was identified as a skeleton alloy-supported catalyst from the lattice sites of which Co was removed.

Comparative Example 7

(Production Example 18)
Production of platinum-nickel alloy supported catalyst (C-18*):

The procedure of Production Example 3 was repeated except that the Pt/C catalyst (C-12*) of Production Example 12 was used and, to a slurry thereof, an aqueous solution containing 4.0 g of Ni as nickel (II) nitrate was dropwise added. Thus, a Pt—Ni solid solution alloy supported catalyst (C-18*) was obtained. Its XRD revealed that it was comprised of a face-centered cubic alloy having a lattice constant a of 3.762 A.

Example 4

(Production Example 19)
Production of platinum skeleton alloy supported catalyst (C-19):

The procedure of Example 1 was repeated except that the Pt—Ni alloy-supported catalyst (C-18*) obtained in Production Example 18 was used, 100 ml of the 105% polyphosphoric acid was replaced with 100 ml of a 0.5N aqueous nitric acid solution and the mixture was maintained in a stream of nitrogen gas at 60° C. for 5 hours. Thus, a platinum skeleton alloy supported catalyst (C-19) was obtained, having a Pt:Ni atomic ratio of 75:25 and comprised of a face-centered cubic alloy having a lattice constant a of 3.784 A. Meanwhile, in a catalyst of Pt—Ni solid solution alloy having a Pt:Ni atomic ratio of 75:25 supported on carbon (C-20*) separately produced (in Production Example 20) in the same manner as in Production Example 17 except that the amount of Ni charged was changed to 0.85 g, it had a face-centered cubic lattice constant a of 3.860 A.

In the same manner as the above, Pt—Cr, Pt—Mn, Pt—Ga—Co, Pt—V—Fe and Pt—Fe—Co solid solution alloy-supported catalysts C-21*, C-24*, C-27*, C-30* and C-33* were produced from 20% Pt/C. From these catalysts, Cr, Mn, Ga/Co, V/Fe and Fe/Co were respectively removed in the same manner as in Example 1 to obtain the corresponding platinum skeleton alloy supported catalysts C-22, C-25, C-28, C-31 and C-34, respectively. The lattice constants of these original base metal-rich platinum solid solution alloy-supported catalysts and platinum skeleton alloy-supported catalysts were given for comparison in Table 2, together with the lattice constants of alloy-supported catalysts C-23*, C-26*, C-29*, C-32* and C-35* separately produced, having the composition respectively corresponding to the skeleton catalysts.

TABLE 2

| | Solid solution alloy (A) | Skeleton alloy (B) | Solid solution alloy (C) with composition of (B) |
|---|---|---|---|
| | Pt:Cr | | |
| | C-21* | C-22 | C-23* |
| Atomic ratio: | 52:48 | 78:22 | 78:22 |
| Crystal form: | Disordered fcc | Disordered fcc | Disordered fcc |
| Lattice constant: | 3.849 | 3.857 | 3.879 |
| | Pt:Mn | | |
| | C-24* | C-25 | C-26* |
| Atomic ratio: | 45:55 | 76:22 | 76:22 |
| Crystal form: | Tetragonal | Tetragonal | Ordered |
| Lattice constant: | a = b = 4.004 c = 3.676 | a = b = 3.974 c = 3.719 | cubic 3.885 |
| | Pt:Ga:Co | | |
| | C-27* | C-28 | C-29* |
| Atomic ratio: | 51:24:25 | 79:9:12 | 79:9:12 |
| Crystal form: | Disordered fcc | Disordered fcc | Disordered fcc |
| Lattice constant: | 3.840 | 3.856 | 3.885 |

TABLE 2-continued

|  | Solid solution alloy (A) | Skeleton alloy (B) | Solid solution alloy (C) with composition of (B) |
|---|---|---|---|
|  | Pt:V:Fe | | |
|  | C-30* | C-31 | C-32* |
| Atomic ratio: | 50:25:25 | 76:13:11 | 76:13:11 |
| Crystal form: | Disordered fcc | Disordered fcc | Disordered fcc |
| Lattice constant: | 3.854 | 3.863 | 3.889 |
|  | Pt:Fe:Co | | |
|  | C-33* | C-34 | C-35* |
| Atomic ratio: | 48:26:26 | 74:13:13 | 74:13:13 |
| Crystal form: | Ordered cubic | Ordered cubic | Disordered fcc |
| Lattice constant: | 3.783 | 3.816 | 3.864 |

Comparative Example 8

(Production Examples 36 & 37)
Production of platinum-supported catalysts:

The procedure of Production Example 1 was repeated except that the heat-treated carbon black having a specific surface area of 110 $m^2/g$ was replaced with untreated carbon black (trade name: VULCAN XC-72R, available from Cabot Corp.) having a specific surface area of 260 $m^2/g$ and the charging ratio of carbon:Pt was changed to follow Production Example 11. Thus, a 30% Pt/C catalyst (C-36*) and a 40% Pt/C catalyst (C-37*) were produced.

Example 5

(Production Examples 38 & 39)
Production of platinum skeleton alloy supported catalysts:

The procedure of Comparative Example 2 was repeated except that the 10% Pt—C catalyst (C-1*) used therein was replaced with 50 g of 30% Pt/C catalyst (C-36*), which was slurried in 3,000 ml of deionized water, and that an aqueous solution of a mixture of cobalt (II) nitrate containing 2.25 g of Co and nickel (II) nitrate containing 2.25 g of Ni, in place of Cu, was added. Thus, a Pt—CO—Ni solid solution alloy-supported catalyst (C-38*) was obtained. Subsequently, this was treated in the same manner as in Example 1 to obtain a platinum skeleton alloy supported catalyst (C-39) having the composition with a Pt:Co:Ni atomic ratio of 74:13:13. Meanwhile, from C-36*, a solid solution alloy-supported catalyst (C-40*) having the same composition was directly produced.

Similarly, to 50 g of 40% Pt/C catalyst (C-37*), an aqueous solution of copper (II) nitrate containing 6.5 g of Cu was added to produce a Pt—Cu solid solution alloy-supported catalyst (C-41*). This was treated in the same manner as in Example 1 to produce a platinum skeleton alloy-supported catalyst (C-42) having the composition with a Pt:Cu atomic ratio of 72:28. Also, from C-37*, a solid solution alloy-supported catalyst (C-43*) having the same composition was directly produced.

The crystal forms and lattice constants of these alloy supported in the catalysts were given for comparison in Table 3.

TABLE 3

|  | Solid solution alloy (A) | Skeleton alloy (B) | Solid solution alloy (C) with composition of (B) |
|---|---|---|---|
|  | Pt:Co:Ni | | |
|  | C-38* | C-39 | C-40* |
| Atomic ratio: | 50:25:25 | 74:13:13 | 74:13:13 |
| Crystal form: | Disordered fcc | Disordered fcc | Disordered fcc |
| Lattice constant: | 3.774 | 3.797 | 3.845 |
|  | Pt:Cu | | |
|  | C-41* | C-42 | C-43* |
| Atomic ratio: | 50:50 | 72:28 | 72:28 |
| Crystal form: | Disordered fcc | Disordered fcc | Disordered fcc |
| Lattice constant: | 3.791 | 3.809 | 3.852 |

2. Production of electrode:

The catalysts C-1*, C-3*, C-9*, C-11 and C-12* to C-43* obtained in the foregoing Production Examples 1, 3, 9 and 11 to 43, respectively, were each ultrasonically dispersed in an aqueous polytetrafluoroethylene dispersion (trade name: TEFLON TFE-30, available from Du Pont) to obtain a uniform slurry containing the catalyst and the polytetrafluoroethylene in a dried-weight ratio of 50:50. To this mixture slurry, aluminum chloride was added to form a flocculent precipitate. This flocculent precipitate was deposited (built-up) on a carbon paper support substrate (trade name: TGP-H-12, available from Toray Industries, Inc.) having been made water-repellent with polytetrafluoroethylene, and was then pressed, followed by drying and thereafter baking in a stream of nitrogen at 350° C. for 15 minutes to obtain an electrode. Electrodes produced using the catalysts C-1*, C-3*, C-9*, C-11 and C-12* to C-43* are called E-1*, E-3*, E-9*, E-11 and E-12* to E-43*, respectively. These electrodes were all produced so as to contain the catalyst in an amount of 5.0 mg (in terms of dry weight) per 1 $cm^2$ of the electrode. The electrodes having the catalysts according to Examples and Comparative Examples, thus produced, were put to the following performance tests.

3. Performance Tests (1) Test for mass activity on oxygen reduction reaction:

A circular electrode test piece of 24 mm in diameter was, on its side coated with catalyst layer, brought into contact with a 105% phosphoric acid electrolyte kept at 200° C., and, to the other gaseous diffusion layer side, oxygen ($O_2$) was fed at a flow rate of 600 ml/min. This electrode was set as a working electrode, and a reference hydrogen electrode (RHE) was made of a Luggin tube subjected to bubbling with hydrogen gas along a platinum wire. A counter electrode made of a platinum mesh was provided. Electric currents were passed between the working electrode and the counter electrode at various current densities ranging from 0 to 600 $mA/cm^2$, where their polarization potential was measured. Internal resistance (IR) was corrected by the current interruption method. With respect to the respective electrodes E-1*, E-3*, E-9*, E-11 and E-12* to E-43*, internal resistance-free (IR-free) electrode potentials to current densities were plotted on a semilogarithmic graph to determine the current density at plus 900 mV vs. the RHE, and the mass activity (mA/mg Pt) of each catalyst was determined from the values obtained. Results are given in Tables 4 to 7.

TABLE 4

| Catalyst | | | EC · MSA | Oxygen reduction mass activity |
|---|---|---|---|---|
| No. | Constitution | Electrode | $(m^2/g)$ | $(\mu A/mgPt)$ |
| C-1* | 10% Pt/C | E-1* | 120 | 40 |
| C-9* | Pt-Cu(16:84) alloy/C | E-9* | 72 | 70 |
| C-11 | Pt-Cu(16:24) skeleton alloy/C | E-11 | 91 | 86 |
| C-3* | Pt-Cu(76:24) alloy/C | E-3* | 75 | 68 |

TABLE 5

| Catalyst | | | EC · MSA | Oxygen reduction mass activity |
|---|---|---|---|---|
| No. | Constitution | Electrode | $(m^2/g)$ | $(\mu A/mgPt)$ |
| C-12* | 20% Pt/C | E-12* | 116 | 39 |
| C-13* | Pt-Cu(50:50) alloy/C | E-13* | 68 | 69 |
| C-14 | Pt-Cu(71:29) skeleton alloy/C | E-14 | 77 | 80 |
| C-15* | Pt-Co(50:50) alloy/C | E-15* | 91 | 52 |
| C-16 | Pt-Co(83:17) skeleton alloy/C | E-16 | 99 | 60 |
| C-17* | Pt-Co(83:17) alloy/C | E-17* | 88 | 53 |
| C-18* | Pt-Ni(50:50) alloy/C | E-18* | 88 | 58 |
| C-19 | Pt-Ni(75:25) skeleton alloy/C | E-19 | 102 | 68 |
| C-20* | Pt-Ni(75:25) alloy/C | E-20* | 92 | 60 |
| C-21* | Pt-Cr(52:48) alloy/C | E-21* | 78 | 48 |
| C-22 | Pt-Cr(78:22) skeleton alloy/C | E-22 | 89 | 58 |
| C-23* | Pt-Cr(78:22) alloy/C | E-23* | 80 | 50 |
| C-24* | Pt-Mn(45:55) alloy/C | E-24* | 68 | 47 |
| C-25 | Pt-Mn(76:24) skeleton alloy/C | E-25 | 77 | 54 |
| C-26* | Pt-Mn(76:24) alloy/C | E-26* | 67 | 46 |
| C-27* | Pt-Ga-Co(51:24:25) alloy/C | E-27* | 80 | 72 |
| C-28 | Pt-Ga-Co(79:9:12) skeleton alloy/C | E-28 | 89 | 80 |
| C-29* | Pt-Ga-Co(79:9:12) alloy/C | E-29* | 81 | 68 |
| C-30* | Pt-V-Fe(50:25:25) alloy/ C | E-30* | 74 | 68 |
| C-31 | Pt-V-Fe(76:13:11) skeleton alloy/C | E-31 | 85 | 79 |
| C-32* | Pt-V-Fe(76:13:11) alloy/C | E-32* | 75 | 66 |
| C-33* | Pt-Fe-Co(48:26:26) alloy/C | E-33* | 82 | 84 |
| C-34 | Pt-Fe-Co(74:13:13) skeleton alloy/C | E-34 | 94 | 95 |
| C-35* | Pt-Fe-Co(74:13:13) alloy/C | E-35* | 84 | 82 |

TABLE 6

| Catalyst | | | EC · MSA | Oxygen reduction mass activity |
|---|---|---|---|---|
| No. | Constitution | Electrode | $(m^2/g)$ | $(\mu A/mgPt)$ |
| C-36* | 30% Pt/C | E-36* | 107 | 32 |
| C-38* | Pt-Co-Ni(50:25:25) alloy/C | E-38* | 80 | 61 |
| C-39 | Pt-Co-Ni(74:13:13) skeleton alloy/C | E-39 | 89 | 68 |
| C-40* | Pt-Co-Ni(74:13:13) alloy/C | E-40* | 81 | 62 |

TABLE 7

| Catalyst | | | EC · MSA | Oxygen reduction mass activity |
|---|---|---|---|---|
| No. | Constitution | Electrode | $(m^2/g)$ | $(\mu A/mgPt)$ |
| C-37* | 40% Pt/C | E-37* | 100 | 29 |
| C-41* | Pt-Cu(50:50) alloy/C | E-41* | 65 | 58 |
| C-42 | Pt-Cu(78:28) skeleton alloy/C | E-42 | 76 | 65 |
| C-43* | Pt-Cu(78:28) alloy/C | E-43* | 67 | 55 |

As is seen from the above results, the electrodes E-11, E-14, E-16, E-19, E-22, E-25, E-28, E-31 and E-34 showed activities which are 1.4 times to 2.4 times higher than the electrode E-1* using the single platinum supported catalyst having the same platinum loading amount as these. In comparison with electrodes using conventionally known platinum-base metal solid solution alloy-supported catalysts, the electrodes of the present invention showed activities higher by about 10% to 26%.

(2) Single cell test of fuel cells:

The electrode E-1* was set as the anode and the electrode E-12*, E-13* or E-34 as the cathode, which were set face-to-face on their catalyst coated layer sides, and between which an electrolyte sheet comprising an SiC matrix sheet impregnated with 105% phosphoric acid was inserted. Thus, a small-size single cell having an electrode effective area of 7.4 cm×7.4 cm was set up. The electrodes were maintained at 210° C. at a current density of 200 mA/cm$^2$ while feeding hydrogen gas to the anode side and air to the cathode side at flow rates of 100 ml/min and 600 ml/min, respectively, and the changes with time of IR-free terminal voltage were followed up. Compared with cells employing as the cathode the electrode using the platinum-base metal solid solution alloy-supported catalyst or using the conventionally known single platinum supported catalyst, the cell employing as the cathode the electrode produced using the catalyst of the present invention exhibited superior performances in that the cell had not only a higher initial terminal voltage for 1,000 to 2,000 hours, but also rather a very smaller rate of terminal voltage drop, which was as small as about ½ of the conventional catalysts, after 7,000 to 8,000 hours.

Figure 2:
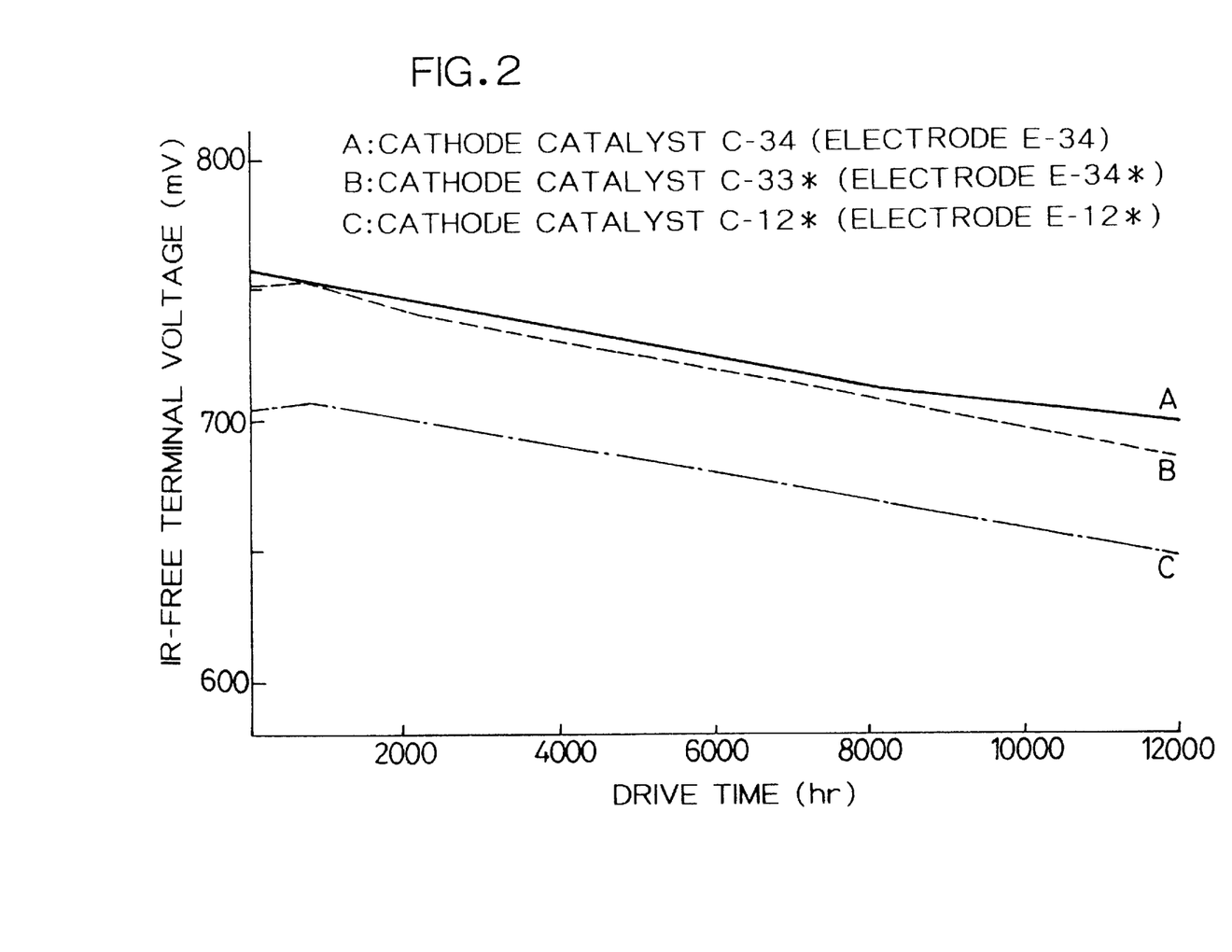
FIG. 2 is a graph showing changes with time of IR-free terminal voltages in a test in which phosphoric acid fuel cells respectively having as the cathode an electrode using a catalyst according to an example of the present invention and and electrode using a catalyst according to a comparative example are operated at a constant current density.

The changes with time of IR-free terminal voltages of the respective cells are shown in FIG. 2.

What is claimed is:

1. An electrocatalyst comprising an alloy of platinum with a base metal selected from the group consisting of gallium, vanadium, chromium, manganese, iron, cobalt, nickel and copper, having a structure of vacant lattice site defects, and a conductive carbon powder on which said alloy is supported.

2. The electrocatalyst according to claim 1, wherein the platinum is supported in an amount of 1% by weight to 60% by weight based on the whole catalyst.

3. The electrocatalyst according to claim 1, wherein the atomic ratio of platinum to the base metal in said platinum skeleton alloy is in the range of 1:1 to 1:0.05.

4. The electrocatalyst according to claim 1, wherein said conductive carbon powder has a BET specific surface area of from 50 to 1,500 $m^2/g$, a graphite (002) crystallite diameter of from 7 to 80 A, a graphite crystal interlattice distance $d_c$ (002) of from 3.40 to 3.79 A, and a DBP oil absorption of from 50 to 700 ml/100 gC.

5. The electrocatalyst according to claim 1, which is a cathode catalyst for a phosphoric acid fuel cell.

6. The electrocatalyst according to claim 5, wherein platinum is supported in an amount of 5 to 30% by weight based on the whole catalyst.

7. The electrocatalyst according to claim 5, wherein said conductive carbon powder is an at least partially graphitized carbon black having a BET specific surface area of from 50 to 180 $m^2/g$, a graphite (002) crystallite diameter of from 10 to 70 A.

8. The electrocatalyst according to claim 1, which is a cathode catalyst for a proton-exchange membrane fuel cell.

9. The electrocatalyst according to claim 8, wherein platinum is supported in an amount of 20 to 50% by weight based on the whole catalyst.

10. The electrocatalyst according to claim 8, wherein said conductive carbon powder has a BET specific surface area of from 120 to 1,500 $m^2/g$ and a graphite (002) crystallite diameter of from 7 to 35 A.

11. An electrode comprising the electrocatalyst as claimed in claim 1 and a water-repellent binder which are bound to a conductive and gas-permeable support substrate.

12. The electrode according to claim 11, which is a cathode for a phosphoric acid fuel cell.

13. The electrode according to claim 11, which is a cathode for a proton-exchange membrane fuel cell.

14. A process for producing the electrocatalyst as claimed in claim 1, the process comprising;

the first step of bringing a solid solution alloy of platinum with a base metal selected from the group consisting of gallium, vanadium, chromium, manganese, iron, cobalt, nickel and copper into support in a highly dispersed state with a conductive carbon powder; and the second step of removing the base metal at least in part from the crystal lattice of the alloy while retaining the crystal form to form a structure of vacant lattice site defects.

15. The process according to claim 14, wherein 20 to 90% by weight of the base metal contained in the platinum solid solution alloy is removed in the second step.

16. The process according to claim 14, wherein the second step comprises suspending a platinum solid solution alloy-supported carbon powder in phosphoric acid heated to 100° C. to 200° C. or in an aqueous mineral acid solution kept at a temperature of room temperature to 100° C. in an atmosphere containing substantially no oxygen, and maintaining the resultant suspension with stirring for a certain time, followed by cooling, filtering, and washing with hot water until the filtrate has an electrical conductivity of 20 $\mu$S/cm or less, and subsequently drying, whereby the base metal being removed.

* * * * *